April 11, 1939. J. H. GRAYSON 2,153,886
OVEN HEAT CONTROL
Filed Nov. 2, 1935 3 Sheets-Sheet 1

Inventor:
John H. Grayson
By Wilson, Lowell,
McCanna & Wintercorn
Attys.

April 11, 1939.  J. H. GRAYSON  2,153,886
OVEN HEAT CONTROL
Filed Nov. 2, 1935  3 Sheets-Sheet 2
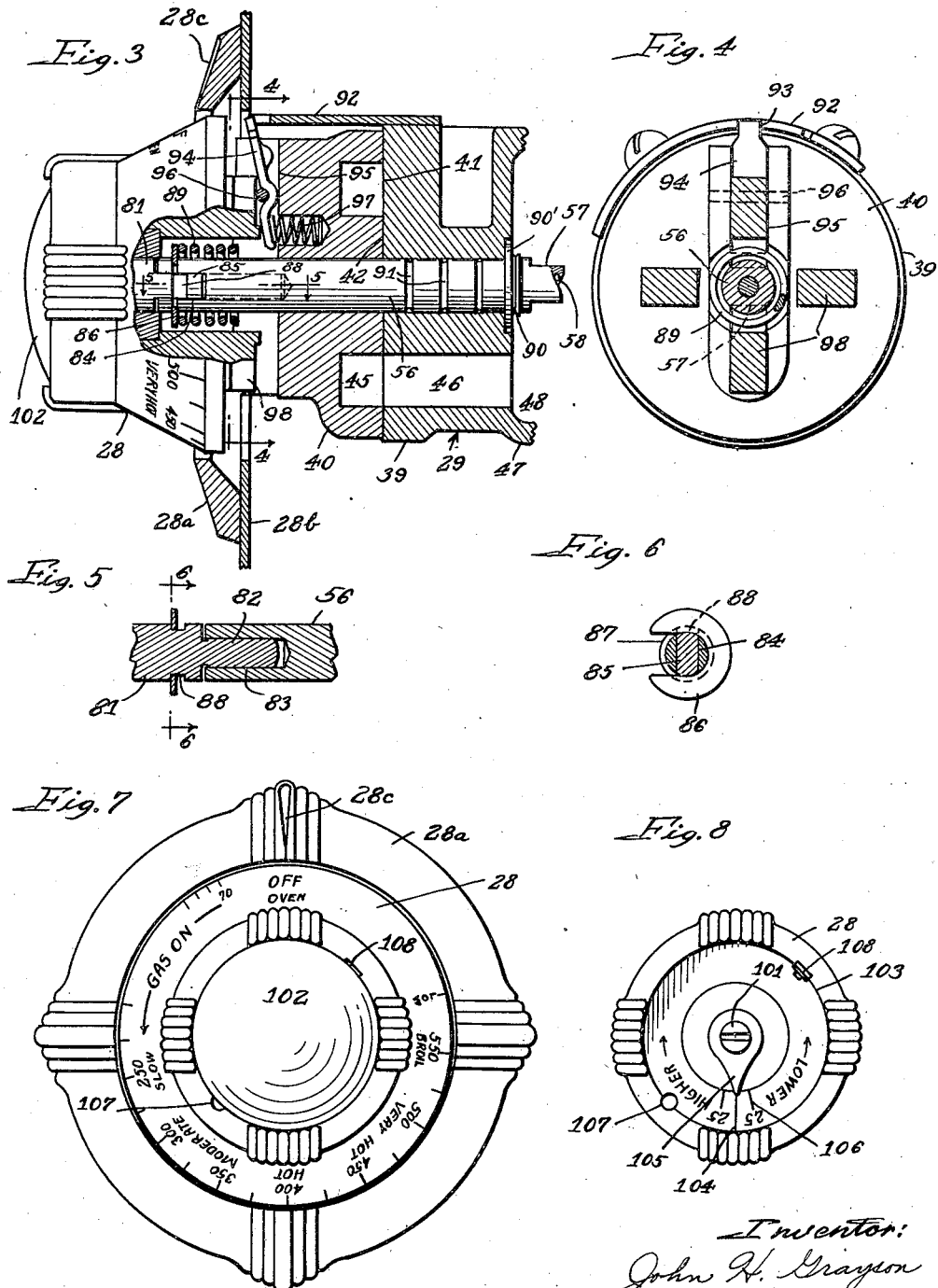

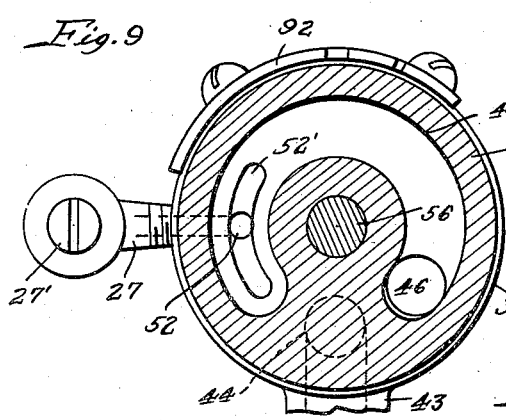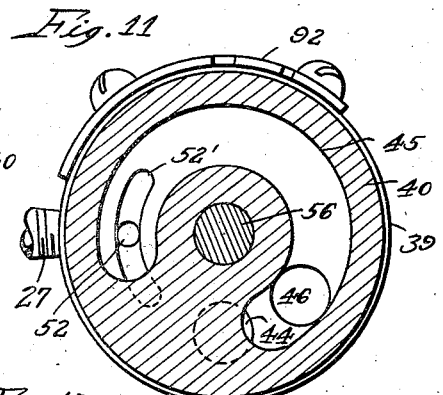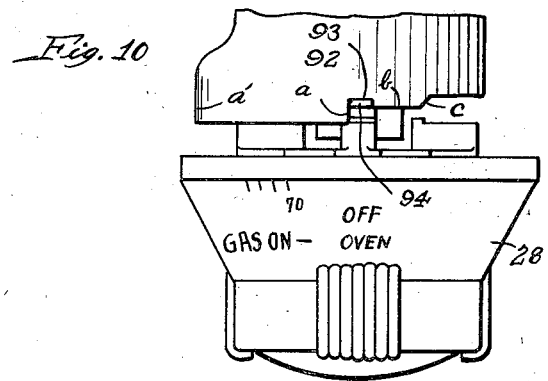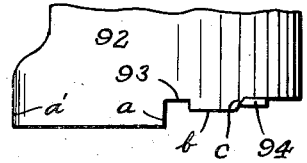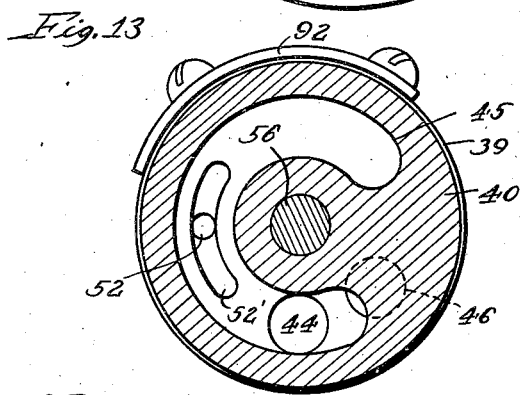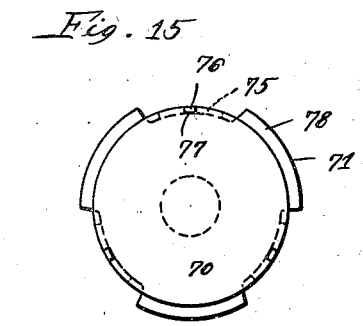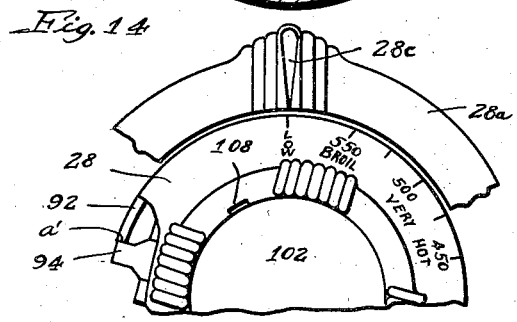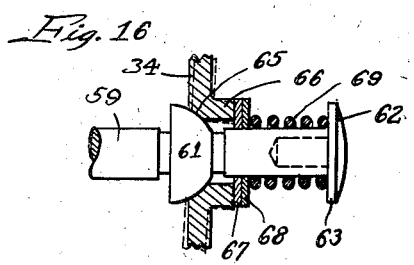

Patented Apr. 11, 1939

2,153,886

UNITED STATES PATENT OFFICE 2,153,886

OVEN HEAT CONTROL

John H. Grayson, Lynwood, Calif., assignor to Grayson Heat Control, Inc., Lynwood, Calif., a corporation of California Application November 2, 1935, Serial No. 47,945

6 Claims. (Cl. 236—15)

This application is a continuation in part of my copending application Serial No. 742,380, filed September 1, 1934.

This invention relates to oven heat controls for gas ranges and, like the aforesaid application, pertains to a combination gas cock and oven temperature regulator—a device in which the operation of a single dial serves the double purpose of opening the gas cock and setting the oven regulator or thermostat for a desired oven temperature.

The principal object of my invention is to provide a generally improved oven heat control in which the regulator and gas cock form a unitary assembly, the present device being designed so as to avoid the complications which invariably entered into previous devices of this type and rendered them impractical because of the inaccessibility of those parts apt to require cleaning, inspection, or repair.

Another important object consists in the embodiment of an expansible bellows in the regulator having a flexible capillary tube extending therefrom to the bulb arranged to be entered in the oven, and means in connection with the bellows inside the regulator for thermostatically compensating for heat absorbed by the regulator as the result of cooking top burners in the vicinity of the regulator being thrown into operation, whereby to eliminate fluctuation in oven temperature.

Other important objects are embraced by this invention, among which may be enumerated the following:

(1) The provision of a holder for the compensating bimetallic thermostatic disk secured to the bellows in a novel manner and specially formed to provide good support for the disk and also an abutment for a restraining spring.

(2) The provision of a spring-pressed detent and cooperating locking plate for releasably locking the gas cock in closed or "off" position, the detent being operable by means of the dial to unlock the gas cock and permit turning of the dial to turn on the gas and set the regulator, and the locking plate being formed for engagement with the detent when the dial is turned back and gets close to the "off" position, whereby to provide an impositive stop to serve as a signal to indicate the position of the dial but permit further turning of the dial in that direction against the resistance imposed by the detent.

(3) The provision in connection with the dial and detent just described of a separate shaft section axially movable relative to a main shaft section with the dial in the operation of the detent, thus leaving the main shaft section, which extends through the stator for rotary adjustment of the valve seat in the regulator, undisturbed and thereby eliminating objectionable wear and consequent gas leakage.

(4) The provision of a simple and easily accessible resetting means for the regulator exposed for operation when a small cover disk on the front of the dial is removed, the resetting means comprising an indicator on the shaft cooperating with graduations on the dial, and the dial being adjustable on the shaft by loosening and retightening a setscrew.

The invention will be better understood as reference is made in the following detailed description to the accompanying drawings, wherein—

Fig. 3 is a view corresponding to a portion of Fig. 2 but illustrating how the dial actuates the detent to unlock the gas cock rotor;

Fig. 4 is a cross-section on the line 4—4 of Fig. 3 showing the rotor of the gas cock in elevation and illustrating the four lugs on the dial, either two of which may cooperate with the rotor and detent depending on the way the oven control is installed;

Fig. 5 is a sectional detail on the line 5—5 of Fig. 3;

Fig. 6 is a cross-section on the line 6—6 of Fig. 5;

Fig. 7 is a front view of Fig. 2 showing the dial and cooperating face plate;

Fig. 8 is a front view of the hub of the dial with the cover disk removed revealing the resetting means;

Fig. 9 is a cross-section of the gas cock taken on the line 9—9 of Fig. 2;

Fig. 10 is a fragmentary plan view of the dial in "off" position corresponding to Fig. 9;

Fig. 11 is similar to Fig. 9 but shows the rotor of the gas cock in a position just before complete shut-off of the gas;

Fig. 12 is a plan view of the locking plate which is also shown in Fig. 10, but showing the detent in the position corresponding to Fig. 11;

Fig. 13 is a view similar to Fig. 9 but showing the rotor in its opposite extreme position for controlled broiling;

Fig. 14 is a view similar to Fig. 7 showing the dial in a position corresponding to Fig. 13;

Fig. 15 is a face view of the compensating bi-metallic thermostatic disk and the holder therefor, and Fig. 16 is an enlarged sectional detail showing how the valve is supported on its stem with freedom to adjust itself.

The same reference numerals are applied to corresponding parts throughout the views.

Figure 1:
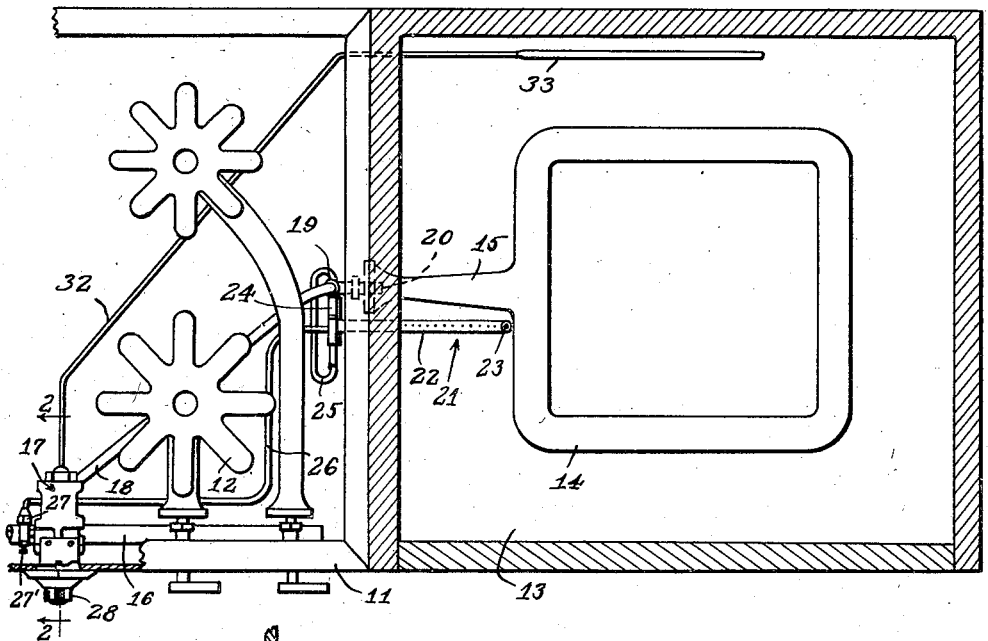
Figure 1 is partly a plan view and partly a horizontal section of a gas stove, showing the oven heat control of my invention applied thereto.

In Figure 1, 11 is the cooking top section of a gas range having the usual burners 12, and 13 is the oven compartment with the oven burner 14 therein. The latter has its mixing tube 15 extending through an opening in the side wall of the oven compartment into the burner box compartment under the cooking top. The gas supply manifold 16 extending along the front of the cooking top has the burners 12 supplied with gas therefrom in the usual way. The oven burner 14 has gas delivered thereto in regulated volume from manifold 16 through the combination gas cock and oven regulator 17, pipe 18, safety pilot or shut-off valve 19, and orifice 20. The valve 19 and orifice 20 form a part of an oven lighter, indicated generally by the numeral 21, which constitutes the subject matter of copending application Serial No. 742,157, filed August 30, 1934. It will suffice for the present purposes to state that this lighter comprises an auxiliary burner 22, a pilot burner 23, and a thermostat 24 arranged to be heated by the flame on the outer end portion of the auxiliary burner 22 to open the valve 19, so as to allow gas to flow to the oven burner 14. The auxiliary burner 22 is supplied with gas from the pipe 18 through the pipe connection 25, independently of the opening of valve 19. The pilot burner 23 is herein shown as supplied with gas from the device 17 through a tube 26, but when a constantly burning pilot is desired, the burner is connected directly to the manifold 16 as illustrated in the earlier application. Connection 27 for the pilot tube 26 in the present case includes a screw adjustment 27' to permit regulating the size of the pilot flame. In operation, when the dial 28 of the combination gas cock and oven regulator 17 is turned to open the cock and set the regulator, gas is delivered through pipe 26 to the pilot burner 23, and the housewife will ignite the burner, and the gas delivered through pipes 18 and 26 to the auxiliary burner 22 will be ignited by the flame of the pilot burner 23. The flame travels from the inner end of the auxiliary burner outwardly to that portion under the thermostat 24, causing the latter to be heated. The thermostat 24 buckles when sufficiently heated and opens the valve 19, thus allowing gas to flow through the orifice 20 to the oven burner 14. The gas issuing from the oven burner is, of course, ignited by the pilot burner 23. While the present invention of a combination oven control is shown in connection with the safety oven lighter just described, it will, of course, be understood that the safety feature might be eliminated and the pipe 18 arranged to discharge directly into the jet or orifice 20, the safety valve 19 and auxiliary burner 22 and thermostat 24 being eliminated.

Figure 2:
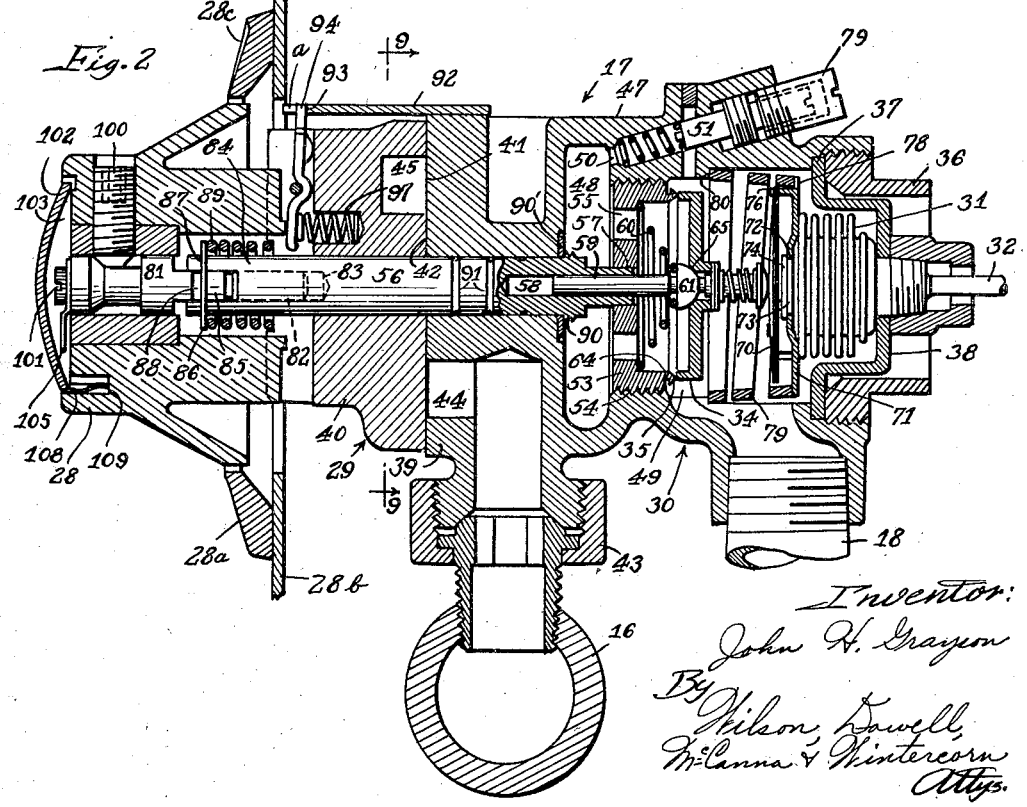
Fig. 2 is a section through the combination gas cock and oven regulator taken on the line 2—2 of Fig. 1.

The combination gas cock and oven regulator 17 of my invention is fully shown in Fig. 2. It is comparable to the combination oven control disclosed in my earlier application Serial No. 700,513, filed December 1, 1933, from the standpoint that it combines a rotary disc-type gas cock 29 and an oven regulator 30 for operation by the single dial 28 so that in one operation of the dial the gas cock is opened and the oven regulator is set for a desired oven temperature. However, the present device differs from the earlier one both in having the cock and regulator in a unitary assembly, instead of merely interconnected for joint operation, and in utilizing an expanding fluid-type thermostat for the regulator consisting of expansible bellows 31, flexible capillary tube 32, and bulb 33, instead of a rod and tube-type thermostat. The advantage in the use of the fluid-type thermostat lies in the fact that it enables me to locate the combination device 17 wherever desired on the stove without special regard to the oven, the tube 32 being flexible so that it can be bent around any obstruction in going from the manifold 16 to that point of the side wall of the oven where the bulb 33 is inserted into the oven. Incorporating the regulator 30 in the same assembly with the cock 29 means the elimination of a pipe connection so that only one pipe 18 is required where two were otherwise required—one going from the cock to the regulator and another from the regulator to the burner. Then too, it is apparent that the combination of the regulator in one assembly with the cock eliminates long intermediate mechanical connections otherwise required between the cock and regulator. The valve 34 co-operating with the seat 35 and operated as hereinafter described, under control of the thermostatic means 31—33, is still easily accessible to permit cleaning the valve and seat; it is only necessary to remove the nut 36 which clamps the flange 37 of the cup 38 in which the bellows 31 is mounted and in which the end of the tube 32 is fastened, as shown. In other words, whereas previous efforts to combine the gas cock and oven regulator in a unitary structure have invariably resulted in too many complications so that such devices have been impractical, the present invention results in a simple and economical structure and one which is thoroughly practical because the parts apt to require cleaning, inspection, or repair, are readily accessible.

The cock 29 is generally similar to that disclosed in Grayson et al. Patent 1,977,552, issued October 16, 1934, and comprises a stator 39 and a rotary disc or rotor 40, the stator having a flat face 41 providing a seat for the flat face 42 of the rotor. The stator is connected as at 43 to the manifold 16, and gas is delivered from the port 44 in the stator through a channel 45 in the rotor to the passage 46 in all positions of the rotor except the "off" position; see Fig. 9. Now the housing 47 of the regulator 30 is formed integral with the back of the stator 39, and there are inlet and outlet chambers 48 and 49 provided therein on opposite sides of the valve and seat 34—35. The chamber 48 communicates with the passage 46, as clearly appears in Fig. 3. Hence, when the cock is opened, gas discharged through passage 46 into chamber 48 will pass into the chamber 49 if the valve 34 is opened, and then will flow through pipe 18 to the oven burner 14, as above described. A by-pass passage 50 interconnects the chambers 48 and 49, and an adjustable valve 51 is provided therein to secure a certain minimum flow of gas sufficient to keep the oven burner from being extinguished when the valve 34 closes under control of the thermostatic means 31—33. The pilot burner 23 is supplied with gas through the port 52 and channel 52' in the stator 39 in all positions of the rotor 40 except the "off" position (Fig. 9).

The regulator 30 has the valve seat 35 thereof provided in an externally threaded cylindrical plug 53 adjustably threaded in the internally threaded bore 54 between the chambers 49 and 50. A series of ports 55 in the plug 53 establish communication between the chambers 48 and 49 when the valve 34 is open. The plug 53 may be turned by means of a control shaft 56 with the dial 28 and rotor 40, the control shaft 56 having a sliding driving connection with the plug 53 at 57, as by a flat-sided end portion of the shaft having a working fit in a correspondingly shaped hole in the plug. The valve 34, as will be pointed out hereinafter, is movable toward and away from the seat 35 on the plug 53 in the expansion and contraction of the bellows 31, and the object in adjusting the plug 53 is to raise or lower the temperature that will be maintained—the farther the plug 53 is adjusted away from the valve 34, the higher the oven temperature maintained. The plug 53 has left-handed threads, and hence when the cock 29 is opened by clockwise turning of the dial 28 and shaft 56, the plug 53 is backed away from the valve 34, that is, it moves to the left, as viewed in Fig. 2, the extent of movement being dependent upon how far the dial is turned. The inner end of the shaft 56 has an axial bore 58 forming a guide for the valve stem 59. A coiled compression spring 60 acts between the plug 53 and one side of an enlarged portion 61 on the stem 59 to normally urge the valve 34 away from the seat 35, and the valve is arranged to be moved in the other direction toward the seat under the action of the bellows 31; the bellows expands when heated and bears against the spheroidal face 62 on the head 63 of a plug pressed into a bore in the end of the stem 59, whereby to move the valve 34 toward the seat 35 against the action of spring 60, thus regulating the oven temperature and preventing heating beyond a selected oven temperature for which the regulator has been adjusted.

Attention may now be called to the special form of the valve seat 35 and the annular external groove 64 provided in the plug 53 directly behind the seat, between the seat and the larger threaded body portion of the plug. The seat is of triangular cross-section with the apex of the triangle forming a sharply defined valve seat surface to be engaged by the valve 34. The groove 64 is located directly behind the triangular valve seat portion with one side of the groove formed by a portion of the base of the triangle and the other side of the groove formed by the end of the relatively larger body portion of the plug 53. This groove is therefore situated so that any oil draining off the end of the plug 53 in its threading back and forth will enter the groove and drain off into the outlet chamber 49 instead of collecting on the sharply defined valve seat surface and interfering with proper functioning of the valve and consequent inaccuracy of the regulation of oven temperature. Attention may also be called at this point to the fact that the enlarged portion 61 on the valve stem 59 is of spheroidal form, as clearly appears in Figs. 2 and 16, and has a working fit in the socket 65 provided therefor in the center of the valve 34 concentric with the hub portion 66. A graphite impregnated washer 67 bears against the end of the hub 66 and has a snug fit on the valve stem 59 to effect a gas-tight seal. A metallic washer 68 holds the sealing washer 67 in place under the action of a compression spring 69 surrounding the valve stem 59 and abutting the head 63, previously referred to. By virtue of this construction, the valve 34 can adjust itself relative to the stem 59, as indicated by the dotted line position shown in Fig. 16, to seat properly on the seat 35. That is to say, despite any slight discrepancy in the relationship of the stem to the seat when the device is assembled, the valve will shift by itself into exact parallel relationship to the seat and will thereafter always open and close in parallel relation to the seat. The washer 67 in the shifting of the valve maintains a good seal regardless of slight inclination of the valve one way or another with respect to the valve stem.

At 70 is shown a bimetallic disc mounted in a holder 71 on the front end of the bellows 31 to compensate for heating of the regulator 30 and bellows 31 therein by reason of operation of the cooking top burners 12. I found by experiment that when the regulator was set for say 400° and one or more of the cooking top burners were turned on, the oven temperature would drop anywhere from 15° to 75,° due to the heat of the burners causing expansion of the bellows 31 and consequent closing of the valve 34. With the counteracting thermostat 70, which is also responsive to the same extraneous heating by the cooking top burners, the objectionable oven temperature drop is eliminated. It will be observed that the disc 70 is normally bulged toward the valve 34. When it is heated, this disc tends to flatten and consequently it offsets the tendency of the bellows 31 to close the valve by an equal and opposite reaction of tending to open the valve. The valve 34, regardless of its position determined by the setting of the regulator and the oven temperature attained, will not therefore be affected by this outside disturbance caused by the cooking top burners. The provision of thermostatic means, as just described, to provide for total compensation against oven temperature drop, is of importance on all stoves, but particularly closed top stoves where, when the four burners are turned on full, the bellows 31 is apt to be heated sufficiently to result in an oven temperature drop of anywhere from 15° to 75°, as previously indicated.

The holder 71 for the compensating thermostat 70 is in the form of a flat circular plate having a central opening 72 through which a reduced neck portion 73 on the end of the bellows 31 projects. The projecting portion of the neck 73 is spun over, as at 74, to clamp the plate rigidly onto the bellows. Three lugs 75 are struck up from the marginal portion of the plate in equally circumferentially spaced relation, as appears in Fig. 15, and has reduced portions 76 thereon entered in notches 77 in the periphery of the disc 70 to support the disc in concentric relation to the plate and bellows, and accordingly in concentric relation to the valve stem 59. The remaining marginal portions 78 of the plate 71 between the lugs 75 constitute abutments for supporting one end of the restraining spring 79, the other end of which bears at 80 on an annular shoulder provided in the outlet chamber 49. The spring is therefore also supported in concentric relation to the parts previously mentioned, and the bellows is maintained under a predetermined spring pressure. It should be obvious from the foregoing that as the bellows expands, it moves the valve 34 toward closed position against the action of the valve spring 60 and the restraining spring 79, and that when the bellows contracts, the disc 70 and holder 71 are retracted with relation to the valve under the action of the spring 79, thus allowing the valve 34 to be opened under the action of its spring 60.

The dial 28 for turning the rotor 40 of the gas cock 29 and the valve seat plug 53 of the regulator 30 is mounted on a separate stub shaft 81 which is axially movable relative to the shaft 56 but non-rotatable with respect thereto. A reduced pilot portion 82 on this stub shaft is reciprocable in an axial bore 83 in the end of the shaft 56, and a diametrical slot 84 provided in the end of the shaft intersecting the bore receives the reduced flat-sided portion 85 of the shaft, whereby to provide a sliding driving connection between the shafts 56 and 81. A C-washer 86 fits in an annular groove 87 provided in the end of the shaft 56 and also in the wider registering annular groove 88 provided in the portion 85 of the shaft 81, whereby to detachably secure the shaft 81 in assembled relation to the shaft 56 while permitting in-and-out movement of the shaft 81 with the dial 28. The shaft 81 is shown moved in with the dial 28 in Fig. 3, and it will be observed in Fig. 5 that the washer 86 limits this movement by engagement with the opposite side of the groove 88. The washer 86 also serves as an abutment for one end of a coiled compression spring 89, the other end of which bears against the rotor 40 of the gas cock to hold the same seated under a predetermined pressure sufficient to prevent gas leakage. A shouldered portion 90 is provided on the opposite end of the shaft 56, as by swedging, and serves by abutment with a washer 90' to hold the shaft against endwise movement forwardly under the action of the spring 89. Annular grooves 91 in the shaft 56 are located in the stator portion 39 of the gas cock and serve to prevent gas leakage. An oil film in these grooves is sufficient to retain gas at the normal operating pressure. This shaft is furthermore not subject to much wear, inasmuch as the cooperating stub shaft 81 reciprocates with respect thereto, and thus avoids the necessity for reciprocation and consequent wear of the shaft 56. The reciprocation of the stub shaft 81, as will now be described, is required to unlock the device and permit rotation of the dial 28.

An arcuate locking plate 92 secured to and projecting forwardly from the stator 39 of the gas cock over the rotor 40, has a notch 93 therein alongside a stop a formed by a forwardly projecting portion of the plate. A cam surface b is provided on the front end of the plate on the other side of the notch terminating in a drop-off cam portion c. A detent 94 is arranged to enter the notch 93 to lock the dial 28 and gas cock rotor 40 against rotation, this detent being mounted in a diametrical groove 95 in the face of the rotor 40 for pivotal movement with respect to a cross-pin 96, and normally urged toward locking position by a coiled compression spring 97 seated in a recess provided in the rotor. Now, the dial 28 has on the back thereof four lugs 98, 90° apart, any two of which are arranged to be entered slidably in the diametrical groove 95, as should be evident from observation of Figs. 3 and 4. The purpose of this provision of additional lugs is to permit placing the device on the gas range in any desired position, the dial being simply turned around to suit the installation so that the "off" position will be on top as in Fig. 7. This avoids confusion in the operation of the device and permits placing the face plate 28a on the front panel 28b of the range always in the same position with the pointer or index notch 28c uppermost. One of the lugs engaged in the groove has abutment with the inner end of the detent 94, as appears in Fig. 2, and, when the dial 28 is pushed in against the action of the spring 97, the detent 94 is moved to the position shown in Fig. 3 out of the recess 93 and clear of the surface b, whereby to permit clockwise turning of the dial from the "off" position of Fig. 10 to turn on the gas by opening the cock 29 and at the same time set the regulator by rotary adjustment of its valve seat plug 53. Since the small spring 97 is light in comparison to the spring 89, it is apparent that the unlocking can be accomplished without much effort, and this is another reason for avoiding the necessity for reciprocating the shaft 56 which could only be accomplished against the heavier resistance of the spring 89. In one construction, for example, the spring 97 had a loading of 1½ lbs. as compared with a loading of 6 lbs. for the spring 89. The importance of the two-piece shaft 56—81 must therefore be apparent. Furthermore, by providing the drop-off cam portion c against which the detent 94 is arranged to ride when the dial 28 is turned back toward "off" position and reaches a position where the gas is about to be shut off (see Fig. 11), the housewife can by the sense of "feel" alone tell when this critical point is reached and will not therefore run the risk of turning off the gas accidentally and necessitate relighting the pilot burner. When the detent 94 strikes the drop-off cam portion c, there is sufficient resistance to the further turning of the dial to give the desired signal that the gas is about to be turned off. The dial 28 when unlocked can be turned in a clockwise direction until the detent strikes another stop a' at the opposite end of the plate 92 from the stop a. This position of the dial is indicated in Fig. 14—it is "low" for broiling, and the corresponding setting of the rotor of the gas cock is shown in Fig. 13. It is obvious from this that the broiling flame can be regulated as desired without danger of completely shutting off the gas to the burner.

The dial 28 is arranged to be clamped to the shaft 81 by a set screw 100 (see Fig. 2). It is obviously important to have the dial 28 adjusted to the proper angularity with respect to the shafts 56—81; otherwise the dial would not indicate the correct oven temperature. I have therefore formed a screw head 101 on the end of the shaft 81 accessible by removal of the friction cover cap 102 from the recess 103 provided in the face of the dial. When the screw 100 is loosened and the shaft 81 is held by engagement of a screwdriver in the slot 101, the dial can be turned to move the hairline 104 on the dial either way with respect to an indicator 105 provided on the shaft 81, whereby to adjust the setting higher or lower to make allowance for a different type of oven, or to compensate for some special condition which may have necessitated resetting of the device. After the adjustment has been made, the set screw 100 may, of course, be re-tightened. The hairlines 106 to either side of the line 104 indicate the extent of movement required for a 25° F. adjustment. Thus, if a service man should accidentally loosen the set screw 100 and turn the dial on the shaft, he would not know where it was originally set, but the indicator 105 will enable him to re-set the device back to its original setting. Furthermore, the service man can by the simple re-setting method just described correct any off setting without removing a top burner or any other parts from the stove. The disc 102, while securely held in place against accidentally dropping out, can easily be removed by insertion of a screw-driver or other tool in the notch 107. The fact that the dial 28 is of Bakelite and has a different coefficient of expansion necessitates the provision of a spring clip 108 in the recess 109 engaging the periphery of the disc to hold the same in place frictionally.

It is believed the foregoing description conveys a good understanding of the objects and advantages of my invention. The appended claims have been drawn with a view to covering all legitimate modifications and adaptations.

I claim:

1. In a combination oven control for gas ranges, a rotary gas cock comprising stator and rotor elements, an oven heat regulator having a body integral with the stator element of the gas cock and having a gas discharge passage therethrough communicating with an outlet port provided in the stator, a valve seat member threaded at its periphery in said passage for rotary axial adjustment on substantially the same axis with the rotation of the rotor element end of said gas cock, a main control shaft coaxial with the gas cock and oven heat regulator and having a sliding driving connection at one end with said valve seat member to thread it in either direction, a coaxial auxiliary shaft slidable endwise but non-rotatable with respect to the other end of said control shaft, a manually operable disc carried on and movable endwise with the auxiliary shaft and having a sliding driving connection with the rotor to communicate rotation thereto whereby rotation of the disc serves simultaneously to open the gas cock and adjust the regulator to a desired temperature setting, a valve in said discharge passage movable toward and away from the seat on the valve seat member to regulate gas flow through said passage, thermostatic means for communicating regulatory movement to said valve, and sliding latch means including a cam surface for locking the disc against rotation and for resisting its rotary movement toward locked position.

2. In a disc-type fuel cock and heat control device including a stator and a rotor, a main control shaft extending through the rotor and stator and rotatable with respect to the latter but held against endwise movement with respect thereto, one projecting end of said shaft being adapted to operate a valve means for effecting maintenance of a predetermined temperature, said valve controlling the flow of fuel from the fuel cock, spring means acting upon the other end of said shaft and for holding the rotor seated on the stator, an auxiliary shaft slidable endwise but non-rotatable with respect to the last named end of the main shaft, a manually operable dial carried on and movable endwise with said auxiliary shaft and having a sliding driving connection with the rotor to communicate rotation thereto, a locking plate including a cam surface in rigid relation to the stator, and a latch pivoted on the rotor for oscillating movement with respect thereto and projecting from the rotor for sliding engagement at its outer end with the locking plate including the cam surface thereof, the cam surface being arranged to resist sliding movement of the latch therealong into locking engagement with the plate whereby said resisted movement is transmitted to the manually operable dial, said latch having spring means tending normally to urge it in one direction toward locking engagement with the plate, and said dial being arranged in the endwise movement thereof to engage and move said latch in the opposite direction against the action of the spring means, whereby to unlock the rotor for rotation.

3. A device as set forth in claim 2 wherein the valve means operated by one projecting end of the main control shaft comprises a thermostatic valve casing rigid with the stator, a valve therein, thermo-responsive means for operating said valve, and a valve seat threaded in said casing, said valve seat being operatively connected with the projecting end of the main shaft whereby in the turning of the dial the cock is opened and the valve seat is simultaneously rotated along its threaded portion to assume predetermined positions relative to the valve whereby to adjust the valve for maintenance of a predetermined temperature, said dial being rotatable with respect to suitable indicating means whereby to indicate the temperature selected.

4. A device as set forth in claim 2, wherein the manually operable dial is rotatably adjustably fixed on the auxiliary shaft, the structure including a set screw on said dial arranged to be tightened to fasten the dial in adjusted relationship to the shaft, and the structure further including temperature indicating means relative to which said dial is arranged to be turned in operation to indicate the temperature selected, and the outer end of said auxiliary shaft having a diametrical screw-driver slot provided therein and carrying a pointer rotatable relative to suitable indicating means provided on the dial whereby to indicate the direction and extent of rotary adjustment of the dial relative to the shaft.

5. A device as set forth in claim 2, wherein the manually operable dial is rotatably adjustably fixed on the auxiliary shaft, the structure including a set screw on said dial arranged to be tightened to fasten the dial in adjusted relationship to the shaft, and the structure further including temperature indicating means relative to which said dial is arranged to be turned in operation to indicate the temperature selected, and the outer end of said auxiliary shaft having a diametrical screw-driver slot provided therein and carrying a pointer rotatable relative to suitable indicating means provided on the dial whereby to indicate the direction and extent of rotary adjustment of the dial relative to the shaft, and a cover to enclose the end of the shaft and the pointer, said cover being removably mounted on said dial.

6. In a combination oven control for gas ranges, a rotary gas cock comprising stator and rotor elements, an oven heat regulator having a body integral with the stator element of the gas cock and having a gas discharge passage therethrough communicating with an outlet port provided in the stator, a valve seat member threaded at its periphery in said passage for rotary axial adjustment on substantially the same axis with the rotation of the rotor element end of said gas cock, a main control shaft coaxial with the gas cock and oven heat regulator and having a sliding driving connection at one end with said valve seat member to thread it in either direction, a coaxial auxiliary shaft slidable endwise but non-rotatable with respect to the other end of said control shaft, a manually operable disc carried on and movable endwise with the auxiliary shaft and having a sliding driving connection with the rotor to communicate rotation thereto whereby rotation of the disc serves simultaneously to open the gas cock and adjust the regulator to a desired temperature setting, a coiled compression spring surrounding the outer end of said main control shaft and acting against the rotor element of said gas cock to hold the same seated under spring pressure on the stator element, sliding latch means including a cam surface for locking the disc against rotation, and a latch-operating spring tending normally to move the latch in the direction of the cam surface, said latch being operable manually in the opposite direction by axial movement of said disc with the auxiliary shaft but independently of compression of the aforesaid rotor-seating spring, a valve in said discharge passage movable toward and away from the seat on the valve seat member to regulate gas flow through said passage, and thermostatic means for communicating regulatory movement to said valve.

JOHN H. GRAYSON.